United States Patent
Patel et al.

(10) Patent No.: US 12,282,382 B2
(45) Date of Patent: Apr. 22, 2025

(54) QUADRANT MATRIX BASED PRIORITY CALLS FOR FAILED DRIVES REPLACEMENT

(71) Applicant: INTERNATIONAL BUSINESS MACHINES CORPORATION, Armonk, NY (US)

(72) Inventors: Maunik Patel, Tucson, AZ (US); Tara Astigarraga, Fairport, NY (US); Jimmy Pazhoor John, Cary, NC (US); Kieron Dirk Anthony Hinds, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/954,780

(22) Filed: Sep. 28, 2022

(65) Prior Publication Data

US 2024/0103953 A1   Mar. 28, 2024

(51) Int. Cl.
  *G06F 11/07*  (2006.01)
(52) U.S. Cl.
  CPC ...... *G06F 11/0781* (2013.01); *G06F 11/0709* (2013.01)
(58) Field of Classification Search
  CPC .............. G06F 11/0706; G06F 11/0709; G06F 11/0781
  USPC .......................................... 714/54, 6.3, 6.32
  See application file for complete search history.

(56) References Cited

U.S. PATENT DOCUMENTS

| | | | |
|---|---|---|---|
| 5,371,882 A | 12/1994 | Ludlam | |
| 6,175,621 B1 | 1/2001 | Begeja | |
| 6,996,676 B2 | 2/2006 | Megiddo | |
| 7,434,097 B2 | 10/2008 | Guha | |
| 7,908,526 B2 | 3/2011 | Guha | |
| 8,521,978 B2 | 8/2013 | Kasako | |
| 9,311,176 B1* | 4/2016 | Khokhar | G06F 11/008 |
| 9,413,890 B2 | 8/2016 | McCormack | |
| 10,956,843 B2* | 3/2021 | Morita | G06Q 10/06315 |
| 11,205,159 B2 | 12/2021 | Colena | |
| 11,599,402 B2* | 3/2023 | Vishwakarma | G06F 11/008 |
| 2010/0042516 A1 | 2/2010 | Knipfer | |

(Continued)

FOREIGN PATENT DOCUMENTS

CN   100549968 C   10/2009

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Chae M Ko
(74) *Attorney, Agent, or Firm* — Yee & Associates, P.C.

(57) ABSTRACT

An approach for recommending a prioritized list of replacement of failed drives. The approach receives data associated with failed drives from data centers. The approach segregates the data into variable groups based on a data type. The approach creates a logical layer of entry lists, based on the units, for instantiations of the executable program. The approach sorts the data into priority groups based on priority rules associated with the variable groups and predetermined thresholds. The approach generates a prioritized list of failed drive replacement order based on an ensemble machine learning model. The approach outputs the prioritized list, replacement drive availability information and drive replacement personnel availability information.

20 Claims, 5 Drawing Sheets

(56) References Cited

U.S. PATENT DOCUMENTS

| | | |
|---|---|---|
| 2014/0142998 A1 | 5/2014 | Kroeger |
| 2014/0348318 A1 | 11/2014 | Talapady |
| 2019/0278529 A1 | 9/2019 | Yeung |
| 2020/0019935 A1 | 1/2020 | Jan |
| 2021/0034450 A1* | 2/2021 | Vishwakarma ....... G06F 3/0689 |
| 2021/0097551 A1 | 4/2021 | Tzur |
| 2021/0149777 A1* | 5/2021 | Gao ...................... G06F 11/079 |
| 2021/0326052 A1* | 10/2021 | Singh .................... G06F 3/0617 |
| 2022/0012608 A1 | 1/2022 | Lehmann |

* cited by examiner

QUADRANT MATRIX BASED PRIORITY CALLS FOR FAILED DRIVES REPLACEMENT

TECHNICAL FIELD

The present invention relates generally to data center operation, and specifically, to prioritizing failed drive replacement across a plurality of data centers.

BACKGROUND

Hybrid infrastructure is an IT infrastructure comprising a mix of on-premises data centers, private clouds and/or public clouds. Drives are cornerstone devices for a hybrid infrastructure. Considering the variation of drive requirements over a hybrid infrastructure and time, different types of drives are employed within this environment. As with any computing device, drives are prone to failure based on many factors. If a portion of the operational drives failed in multiple data centers, there is not a mechanism to prioritize the order to send system service representatives (SSR), customer engineers (CE) and/or field agents (FA) in terms of either specific data centers or specific drives within a data center.

Accordingly, a need has evolved for a mechanism to prioritize an order for failed drive replacement to guide SSRs/CEs/FAs to the locations of failed drives are based on a consideration of higher priority to replace vs medium priority to replace vs low priority to replace.

BRIEF SUMMARY

According to an embodiment of the present invention, a computer-implemented method for recommending a prioritized list of replacement of failed drives, the computer-implemented method comprising: receiving, by one or more processors, data associated with a plurality of failed drives from one or more data centers; segregating, by the one or more processors, the data into variable groups based on a data type; sorting, by the one or more processors, the data into priority groups based on priority rules associated with the variable groups and predetermined threshold values; generating, by the one or more processors, a prioritized list of failed drive replacement order based on executing an ensemble machine learning model; and outputting, by the one or more processors, at least the prioritized list, availability information associated with required replacement drives and availability information associated with system service representatives (SSR), customer engineers (CE) or field agents (FA).

According to an embodiment of the present invention, a computer program product for recommending a prioritized list of replacement of failed drives, the computer program product comprising: one or more non-transitory computer readable storage media and program instructions stored on the one or more non-transitory computer readable storage media, the program instructions comprising: program instructions to receive data associated with a plurality of failed drives from one or more data centers; program instructions to segregate the data into variable groups based on a data type; program instructions to sort the data into priority groups based on priority rules associated with the variable groups and predetermined threshold values; program instructions to generate a prioritized list of failed drive replacement order based on executing an ensemble machine learning model; and program instructions to output at least the prioritized list, availability information associated with required replacement drives and availability information associated with system service representatives (SSR), customer engineers (CE) or field agents (FA).

According to an embodiment of the present invention, a computer system for recommending a prioritized list of replacement of failed drives, the computer system comprising: one or more computer processors; one or more non-transitory computer readable storage media; and program instructions stored on the one or more non-transitory computer readable storage media, the program instructions comprising: program instructions to receive data associated with a plurality of failed drives from one or more data centers; program instructions to segregate the data into variable groups based on a data type; program instructions to sort the data into priority groups based on priority rules associated with the variable groups and predetermined threshold values; program instructions to generate a prioritized list of failed drive replacement order based on executing an ensemble machine learning model; and program instructions to output at least the prioritized list, availability information associated with required replacement drives and availability information associated with system service representatives (SSR), customer engineers (CE) or field agents (FA).

Other aspects and embodiments of the present invention will become apparent from the following detailed description, which, when taken in conjunction with the drawings, illustrate by way of example the principles of the invention.

DETAILED DESCRIPTION

Figure 1:
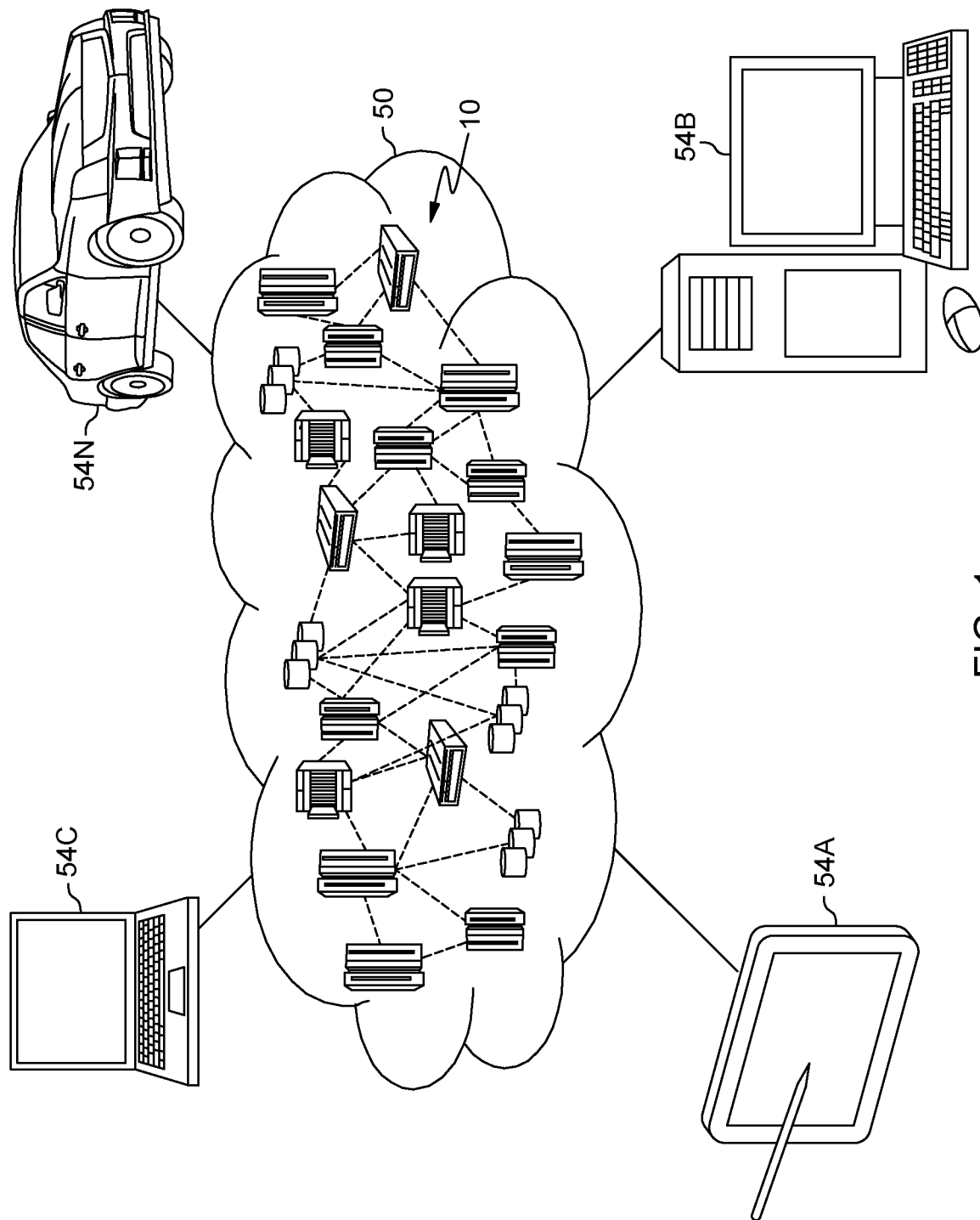
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments for prioritizing a failed drive in one or more data centers with respect to other failed drives in the one or more data centers. It should be noted that a drive is a computer component used to store data and can be a static storage device or can be removable media. It should further be noted that a drive can store nonvolatile data, i.e., the data is not erased when the drive power is turned off. The failed drives can be rated in a priority scheme such as, but not limited to high priority, medium priority, and low priority to determine an order that an SSR/CE/FA should be assigned to replace the drives. The failed drives can be assigned to risk quadrants based on factors associated with the failed drive replacement such as, but not limited to data center infrastructure type, hardware/workload variables, overlapping variables, tiered drive variables, drive user variables, drive part number variables, zone/region variables, data center/cluster ranking variables, SSR/CE/FA variables, and implementation variables.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
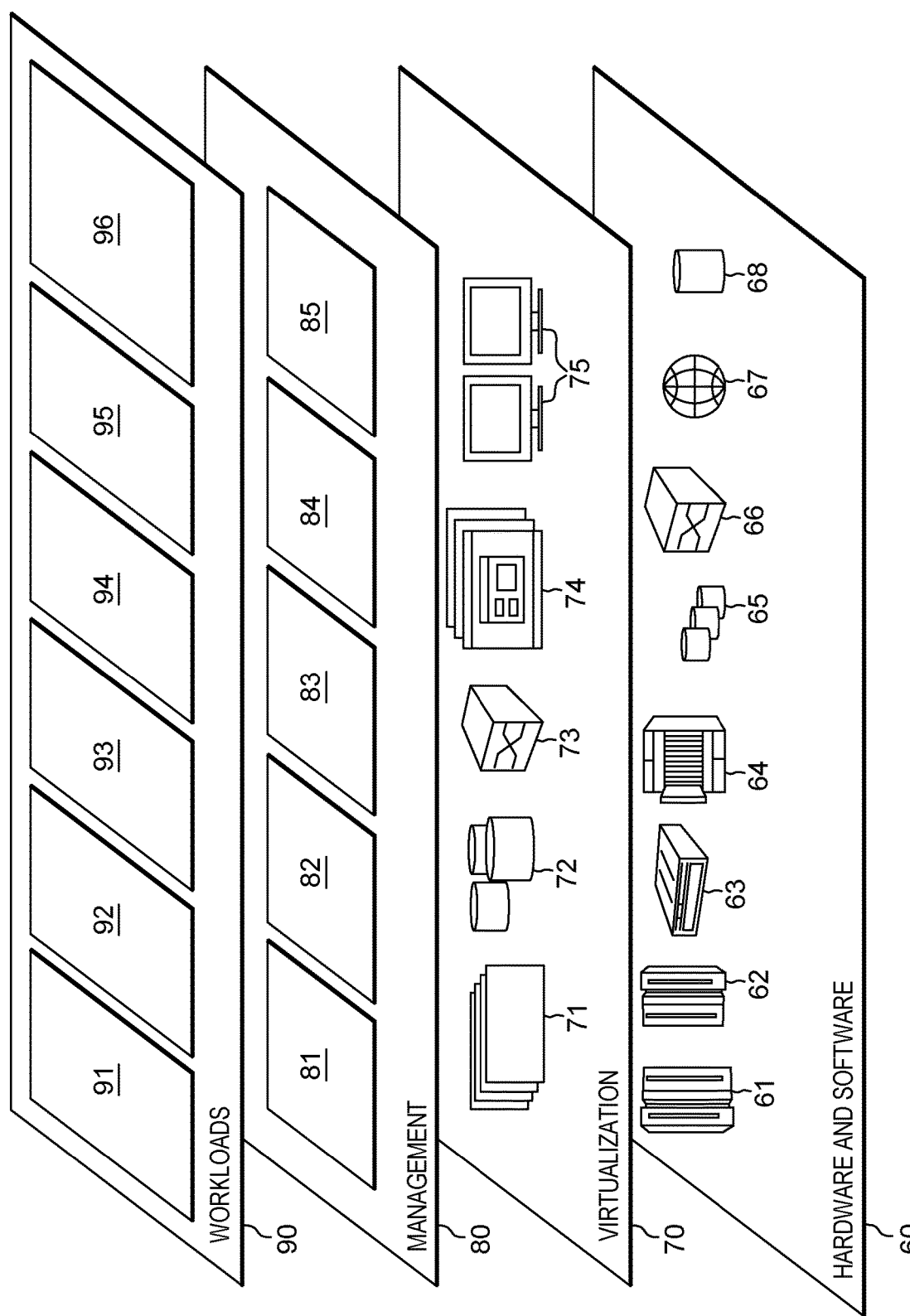
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and failed drive replacement management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
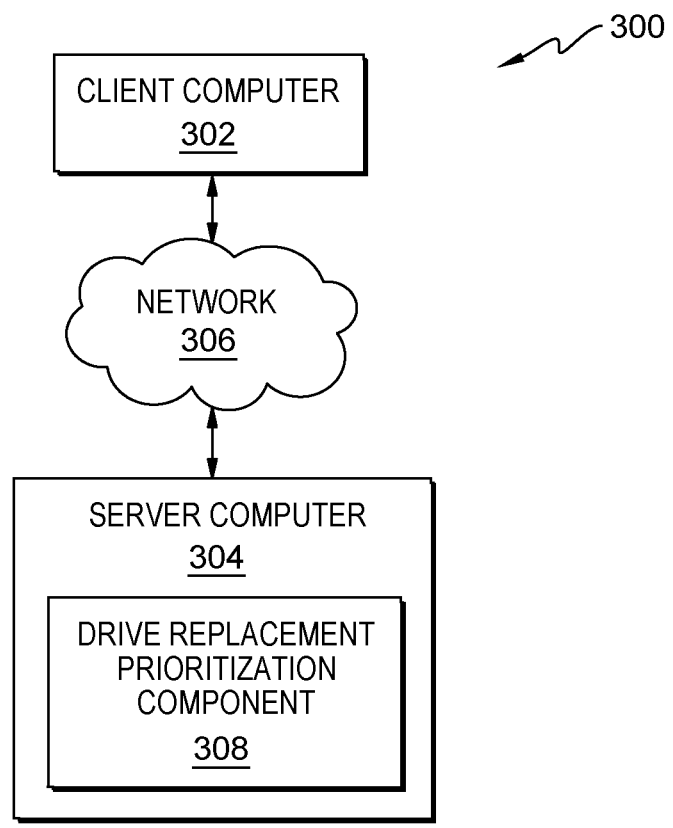
FIG. 3 is a high-level architecture, according to embodiments of the present invention.
Figure 4:
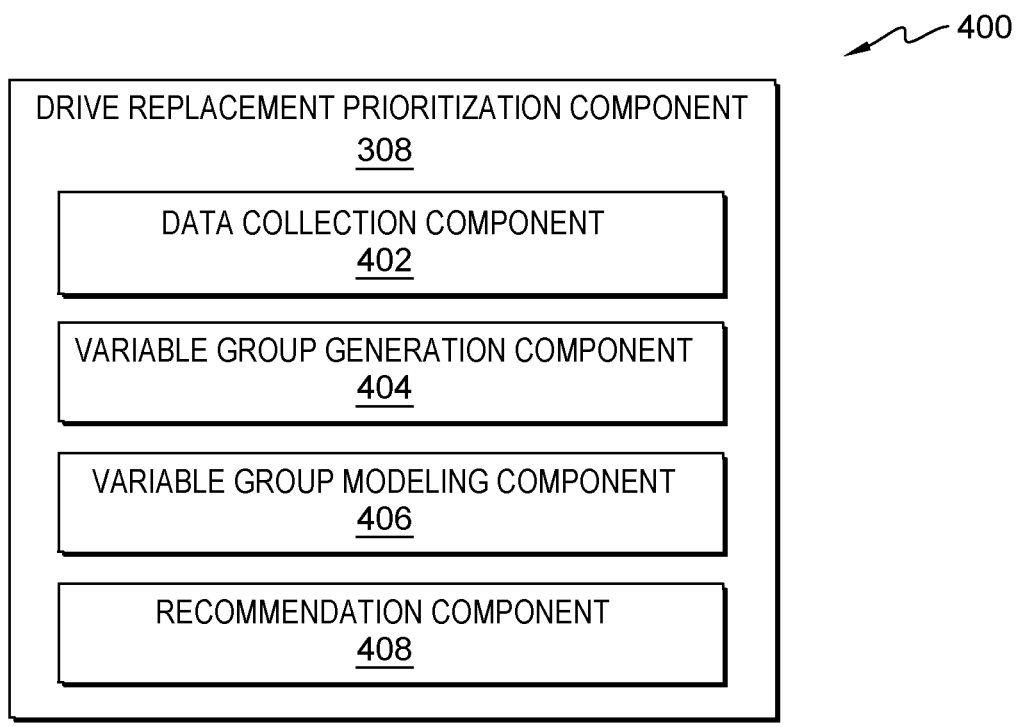
FIG. 4 is an exemplary detailed architecture, according to embodiments of the present invention.
Figure 5:
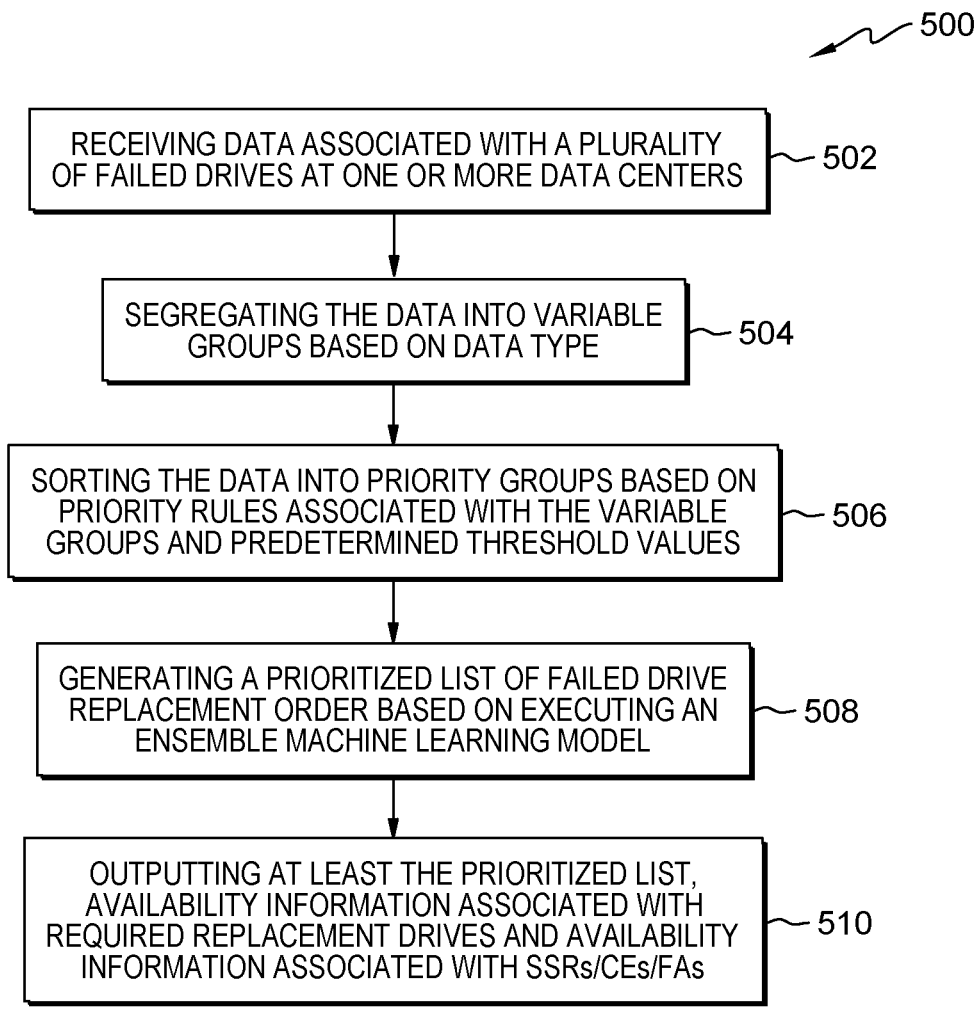
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a failed drive replacement prioritization system, to which the invention principles may be applied. The architecture 300 comprises a client computer 302, a drive replacement prioritization component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one aspect of an embodiment of the present invention, drive replacement prioritization component 308, operational on server computer 304, can provide the capability to receive input associated with components and configuration of a cloud infrastructure. It should be noted that that the cloud infrastructure can be a hybrid cloud infrastructure. In another aspect of an embodiment of the present invention, drive replacement prioritization component 308 can receive/retrieve data from different input sources associated with the cloud infrastructure. In another aspect of an embodiment of the present invention, drive replacement prioritization component 308 can segregate the collected data into different variables.

In another aspect of an embodiment of the present invention, drive replacement prioritization component 308 can sort the data into four quadrants based on a priority associated with the data. In another aspect of an embodiment of the present invention, drive replacement prioritization component 308 can generate a recommendation of a prioritized list for the order to replace a plurality of failed drives.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a drive replacement prioritization component 308, which can further comprise data collection component 402, variable group generation component 404, variable group modeling component 406 and recommendation component 408.

In one aspect of an embodiment of the present invention, data collection component 402 can collect data, e.g., variables, for failed drives associated with a hybrid infrastructure such as, but not limited to, drive size data, drive state data and drive data status. It should be noted that drive size data can be the specified size of a drive, e.g., thirty terabytes. It should also be noted that drive state can comprise an online/offline status of a drive, a usage percentage of a drive, a group membership of a drive, a degraded performance rating of a drive, etc. It should further be noted that a drive data status can comprise a critical rating for data associated with a drive, a non-critical rating for data associated with a drive, an urgent rating for data associated with a drive, a non-urgent rating for data associated with a drive and a no-data rating associated with a drive.

In another aspect of an embodiment of the present invention, data collection component 402 can segregate the data into different variables. For example, hybrid infrastructure variables such as, but not limited to generic structured data from multiple sources and generic unstructured data from multiple sources; hardware/workload variables such as, but not limited to, volumes, managed disks (mdisks), drives, hosts and their respective mapping, and critical workloads telemetry priorities; overlapping variables such as but not limited to, redundant array of independent disks (RAID) considerations, multi-capacity drives in an array, is a smaller drive available consideration, multiple failed disks, mdisk not near capacity so replace with a lower capacity drive consideration, etc.; tiered drive variables such as, but not limited to, increasing/decreasing tier and tolerance priority; customer variables such as, but not limited to, customer priority ranking based on contract value, importance of contract, visibility, and public perception; drive variables such as, but not limited to, part number/FRU number, drive serial number, drive capacity, drive product identity, drive vendor identity, drive class, drive firmware revision, and drive tier type; zone/region variables such as, but not limited to, single zone, multi-zone, and federal zone regions; ranking variables such as but not limited to, single data center storage clusters, and multi-data center storage clusters; and CE/SSR/FA variables such as, but not limited to, case volume, location of SSR options compared to lab, and parts availability.

In one aspect of an embodiment of the present invention, variable group generation component 404 can sort the failed drives into different groups based on the collected variables previously described. For example, four quadrants can be created to divide the available variables wherein quadrant one (Q1) can be a challenges quadrant, quadrant two (Q2) can be a high priority quadrant, quadrant three (Q3) can be a medium priority quadrant, and quadrant four (Q4) can be a low priority quadrant.

In another aspect of an embodiment of the present invention, variable group generation component 404 can analyze challenges associated with obtaining replacement drives for a failed drive with respect to inclusion on Q1. For example, a challenge can include, but is not limited to availability of a replacement drive, unknown factors associated with availability of a replacement drive, and unknown estimated time of availability for a replacement drive.

In another aspect of an embodiment of the present invention, variable group generation component 404 can analyze variables associated with the failed drives to determine an appropriate quadrant for inclusion. For example, if an analysis determines that a failed drive is storing critical data and loss of use of the drive is immediately urgent, then variable group generation component 404 can assign the failed drive to Q2. In another aspect of an embodiment of the present invention, if variable group generation component 404 determines that a failed drive is storing critical data, but the loss of use of the drive is not immediately urgent, then variable group generation component 404 can assign the failed drive to Q4. In another aspect of an embodiment of the present invention, if variable group generation component 404 determines that a failed drive is not storing critical data and the loss of use of the drive is not immediately urgent, then variable group generation component 404 can assign the failed drive to Q3. It should be noted that both critical data and urgency of usage can be determined by usage statistics and/or by manual definition provided by personnel associated with the storage facility.

In another aspect of an embodiment of the present invention, variable group generation component 404 can generate threshold values for sorting the variables among the defined groups. For example, threshold values can be assigned as previously noted for the number of failed drives in a data center. In another example, threshold values can be generated for a size of a failed drive, such as, but not limited to a small drive is less than five terabytes, a medium drive is greater than five terabytes but less than ten terabytes, a large drive is greater than ten terabytes but less than twenty terabytes, an extra-large drive is greater than twenty terabytes, but less than forty terabytes and a double-extra-large drive is greater than forty terabytes.

In another aspect of an embodiment of the present invention, variable group generation component 404 can prioritize data center failed drive replacement based on the number of failed drives associated with the data center. For example, one failed drive can be ranked as a low priority, two failed drives as a medium priority and three or more drives as a high priority. It should be noted that priority values of individually analyzed variable groups can be ranked and or weighted before combining for an overall priority.

In one aspect of an embodiment of the present invention, variable group modeling component 406 can provide the capability to run a collection of machine learning models for the collection of groups. For example, variable group modeling component 406 can execute a machine learning model for each quadrant. It should be noted that this modeling phase can perform variable data validation. In another aspect of an embodiment of the present invention, variable group modeling component 406 can employ ensemble modeling based on individual models to generate priority predictions having greater accuracy for the variable data. It should be noted that the ensemble modeling can be types of ensembles such as, but not limited to, Bayes optimal classifier, Bootstrap aggregating (bagging), Boosting, Bayesian model averaging, Bayesian model combination, Bucket of models, Stacking, etc., but better results are expected when there is a significant diversity among component models.

In one aspect of an embodiment of the present invention, recommendation component 408 can provide the capability to generate a prioritized list of the order to replace failed drives, based on the recommendations output by variable group modeling component 406, to administrative personnel. In another aspect of an embodiment of the present invention, recommendation component 408 can identify the order of data centers and/or failed drives within data centers, to send personnel, e.g., system service representatives (SSR), customer engineers (CE) and/or field agents (FA) to replace the failed drives.

In another aspect of an embodiment of the present invention, recommendation component 408 can be incorporated into an application, e.g., a work order generation application, a personnel assignment application, etc. to accomplish the task of replacing failed drives based on a machine learning ensemble model priority. It should be noted that recommendation component 408 can also output location and availability variables associated with system service representatives (SSR), customer engineers (CE) and/or field agents (FA) as well as availability of the required drives from stock in local or remote warehouses.

FIG. 5 is an exemplary flowchart of a method 500 for recommending a prioritized list of replacement of failed drives. At step 502, an embodiment can receive, via data collection component 402, data associated with a plurality of failed drives associated with one or more data centers. At step 504, the embodiment can segregate, via variable group generation component 404, the data into variable groups based on data type. At step 506, the embodiment can sort, via variable group generation component 404, the data into priority groups based on priority rules associated with the variable groups and predetermined threshold values. At step 508, the embodiment can generate, via variable group modeling component 406, a prioritized list of failed drive replacement order based on executing an ensemble machine learning model. At step 510, the embodiment can output, via recommendation component 408, at least the prioritized list, availability information associated with the required replacement drives, and availability information associated with system service representatives (SSR), customer engineers (CE) or field agents (FA).

Figure 6:
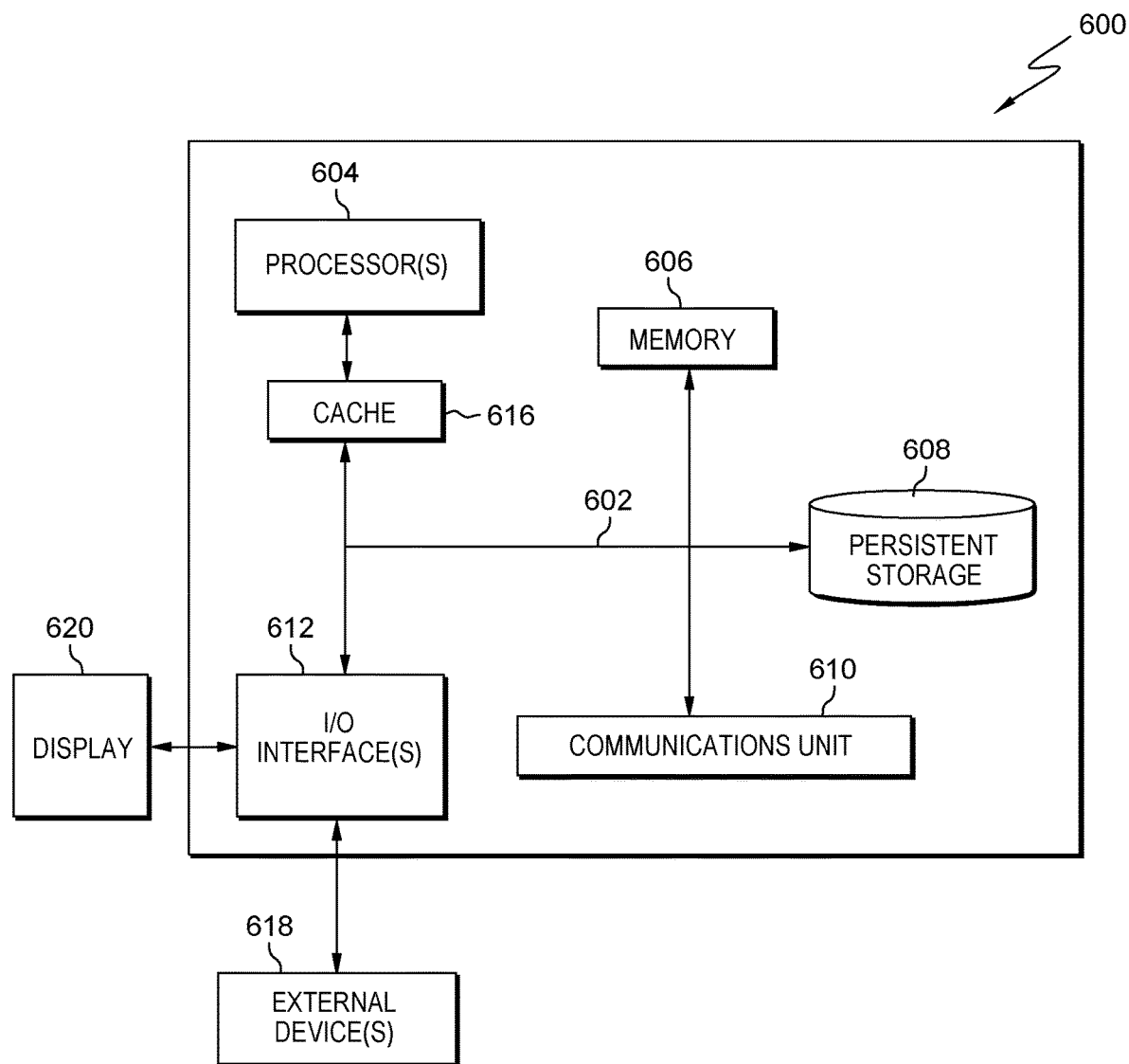
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for replacing of failed drives, the computer-implemented method comprising:
   manufacturing a drive replacement prioritization component, wherein the drive replacement prioritization component comprises a computer readable storage medium storing instructions for executing a prioritization scheme comprising the following steps:
      assigning risk quadrants using variable groups from a plurality of failed drives associated with one or more data centers in a cloud computing environment comprising nodes communicating with each other;
      segregating the variable groups based on a data type;
      sorting the variable groups into priority groups based on priority rules associated with the variable groups and predetermined threshold values;
      generating a prioritized list of failed drive replacement order based on executing an ensemble machine learning model comprising a collection of component machine learning models for the variable groups; and
      outputting at least the prioritized list, availability information associated with required replacement drives and availability information associated with system service representatives (SSR), customer engineers (CE) or field agents (FA); and
   replacing, using the prioritized list, the plurality of failed drives.

2. The computer-implemented method of claim 1, wherein:
   the nodes comprise at least one of: clustered computers and components, a personal digital assistant, a cellular phone, a desktop computer, a laptop computer, a tablet computer, a netbook computer, or an auto computer system; and
   the variable groups comprise two or more of: a data center infrastructure type, hardware/workload variables, overlapping variables, tiered drive variables, drive user variables, drive part number variables, zone/region variables, data cluster ranking variables, system service representatives (SSR)/customer engineers (CE)/field agents (FA) variables, implementation variables, drive size data, drive state data, and drive data status.

3. The computer-implemented method of claim 1, wherein the cloud computing environment comprises: on-demand self service, broad network access, resource pooling, rapid elasticity of scale, and measured service, with options for Software as a Service, Platform as a Service, or Infrastructure as a Service, that can be provided through private, community, public, or hybrid access.

4. The computer-implemented method of claim 1, wherein the variable groups further comprise of one or more of: customer priority ranking, tolerance priority, drive capacity, drive firmware revision, redundant array of independent disks, managed disks, and host mapping.

5. The computer-implemented method of claim 1, wherein the risk quadrants comprise a first quadrant of challenges associated with replacement drives.

6. The computer-implemented method of claim 1, wherein the risk quadrants comprise:
   a second quadrant of failed drives rated high priority:
   a third quadrant rated low priority; and
   a fourth quadrant rated medium priority.

7. The computer-implemented method of claim 6, wherein:
the second quadrant of failed drives comprises data rated critical and immediately urgent;
the third quadrant comprises data rated not critical and not immediately urgent; and
the fourth quadrant comprises data rated critical and not immediately urgent.

8. A drive replacement prioritization component that comprises:
a computer program product configured to:
form an architecture of a computer system, wherein the drive replacement prioritization component comprises a prioritization scheme that assigns risk quadrants based on variable groups from failed drives associated with one or more data centers in a cloud computing environment that comprise nodes communicating with each other;
identify, locate, and initiate a replacement of the failed drives associated with the one or more data centers in the cloud computing environment, wherein the computer program product comprises one or more non-transitory computer readable storage media and program instructions stored on the one or more non-transitory computer readable storage media configured to:
receive data associated with the failed drives in the one or more data centers in the cloud computing environment;
segregate the data into variable groups based on a data type;
sort the data into priority groups based on priority rules associated with the variable groups and predetermined threshold values;
generate a prioritized list of failed drive replacement order based on programs in an ensemble machine learning model that comprise a collection of component machine learning models for the variable groups;
program instructions configured to output at least: the prioritized list, availability information associated with required replacement drives, and availability information associated with system service representatives (SSR), customer engineers (CE) or field agents (FA); and
initiate, based upon the prioritized list, a replacement of the failed drives.

9. The computer program product of claim 8, wherein:
the one or more data centers comprise a mix of: geographically separated data centers, private clouds, or public clouds; and
the variable groups comprise: a data center infrastructure type, hardware/workload variables, overlapping variables, tiered drive variables, drive user variables, drive part number variables, zone/region variables, data cluster ranking variables, system service representatives (SSR)/customer engineers (CE)/field agents (FA) variables, implementation variables, drive size data, drive state data, and drive data status.

10. The computer program product of claim 8, wherein the drive replacement prioritization component may be added to a server computer associated with the of one or more data centers in the cloud computing environment.

11. The computer program product of claim 8, wherein the variable groups further comprise one or more of: customer priority ranking, tolerance priority, drive capacity, drive firmware revision, redundant array of independent disks, managed disks, and host mapping.

12. The computer program product of claim 8, wherein the risk-quadrants comprise a first quadrant of challenges associated with replacement drives.

13. The computer program product of claim 8, wherein the risk quadrants comprise:
a second quadrant of failed drives rated high priority,
a third quadrant rated low priority, and
a fourth quadrant rated medium priority.

14. The computer program product of claim 13, wherein:
the second quadrant of failed drives comprises data rated critical and immediately urgent,
the third quadrant comprises data rated not critical and not immediately urgent, and
the fourth quadrant comprises data rated critical and not immediately urgent.

15. A drive replacement prioritization component that comprises a computer program product configured to:
form an architecture of a computer system, wherein the drive replacement prioritization component comprises a prioritization scheme that assigns risk quadrants based on variable groups from failed drives associated with hybrid infrastructures that comprise nodes communicating with each other;
identify, locate, and initiate a replacement of failed drives, wherein the computer system comprises:
one or more computer processors;
one or more non-transitory computer readable storage media; and
program instructions stored on the one or more non-transitory computer readable storage media, the program instructions that comprise program instructions configured to; receive data associated with a plurality of failed drives from one or more data centers;
segregate the data into variable groups based on a data type;
sort the data into priority groups based on priority rules associated with the variable groups and predetermined threshold values;
generate a prioritized list of failed drive replacement order based on executing an ensemble machine learning model comprising a collection of component machine learning models for the variable groups;
output at least the prioritized list, availability information associated with required replacement drives and availability information associated with system service representatives (SSR), customer engineers (CE) or field agents (FA); and
initiate, based on the prioritized list, a replacement of the plurality of failed drives.

16. The computer system of claim 15, wherein:
the failed drives are associated with hybrid infrastructures that comprise a mix of: geographically separated data centers, private clouds, or public clouds; and
the variable groups comprise: a data center infrastructure type, hardware/workload variables, overlapping variables, tiered drive variables, drive user variables, drive part number variables, zone/region variables, data cluster ranking variables, system service representatives (SSR)/customer engineers (CE)/field agents (FA) variables, implementation variables, drive size data, drive state data, and drive data status.

17. The computer system of claim 15, wherein the drive replacement prioritization component may be added to a server computer associated with the one or more data centers in a cloud computing environment.

18. The computer system of claim 15, wherein the variable groups further comprise one or more of: customer priority ranking, tolerance priority, drive capacity, drive firmware revision, redundant array of independent disks, managed disks, and host mapping.

19. The computer system of claim 15, wherein the risk quadrants comprise;
- a first quadrant that comprises challenges associated with replacement drives,
- a second quadrant that comprises failed drives rated high priority,
- a third quadrant rated low priority, and
- a fourth quadrant rated medium priority.

20. The computer system of claim 19, wherein:
- the second quadrant of failed drives rated high priority comprises data rated critical and immediately urgent,
- the third quadrant comprises data rated not critical and not immediately urgent, and
- the fourth quadrant comprises data rated critical and not immediately urgent.

\* \* \* \* \*